United States Patent [19]

Murphy et al.

[11] Patent Number: 5,036,913
[45] Date of Patent: Aug. 6, 1991

[54] VEHICLE RADIATOR WITH TUBE TO HEADER JOINT FORMED OF A COMPOSITE WELD AND SOLDER BOND

[75] Inventors: Kevin C. Murphy; Darrel C. Christian, both of Jamestown, N.Y.; Jeffrey M. Bentley, Westford, Mass.

[73] Assignee: Valeo Engine Cooling, Incorporated, Jamestown, N.Y.

[21] Appl. No.: 609,230

[22] Filed: Nov. 5, 1990

[51] Int. Cl.⁵ .................. F28F 9/18; B23K 31/02
[52] U.S. Cl. .................. 165/173; 165/153; 29/890.052; 228/175; 228/183
[58] Field of Search ............ 228/183, 175; 29/890.043, 890.052, 890.054; 165/153, 173

[56] References Cited

U.S. PATENT DOCUMENTS

| | | | |
|---|---|---|---|
| 2,785,459 | 3/1957 | Carpenter | 165/173 |
| 3,245,465 | 4/1966 | Young | 165/173 |
| 3,589,440 | 6/1971 | Friedrich | 29/890.052 |
| 4,513,811 | 4/1985 | Lesniak | 165/173 |
| 4,529,034 | 7/1985 | Saperstein | 165/134.1 |
| 4,858,686 | 8/1989 | Calleson | 165/173 |
| 4,965,431 | 10/1990 | Monteleone | 219/123 |

FOREIGN PATENT DOCUMENTS

1097396 2/1955 France .

Primary Examiner—John Rivell
Assistant Examiner—L. R. Leo
Attorney, Agent, or Firm—Dennison, Meserole, Pollack & Scheiner

[57] ABSTRACT

A vehicle radiator and method of manufacture comprising joining the liquid conducting tubes to the tank headers by punching holes with upstanding collars in the headers and inserting a tube end in each collar, each collar to tubing joint being formed by welding an intermediate portion of the joint and filling the rest with solder thereby forming a composite joint of weld and solder with additional solder forming a fillet behind the weld.

19 Claims, 5 Drawing Sheets

VEHICLE RADIATOR WITH TUBE TO HEADER JOINT FORMED OF A COMPOSITE WELD AND SOLDER BOND

BACKGROUND OF THE INVENTION

This invention relates to a liquid gas heat exchanger for transmitting heat from a heated liquid to a cooler surrounding gaseous medium and to a method of manufacturing same. The invention finds particular utility in the manufacture of automobile and truck radiators. It can also be used in the manufacture of automotive air conditioning heaters, as well as industrial and commercial heat exchangers.

A typical vehicular radiator consists of an upper and lower header plate connected by an array of thin walled liquid conducting tubes, usually made of metals or plastics. The header plates have punched openings surrounded by upset collar portions which receive the ends of the tubes. The tube ends are joined to the collar portions in a liquid tight joint by means of various metal joining techniques, such as welding, brazing, soldering and plastic bonding. The top header plate is closed off to form an intake tank to receive the hot coolant from the engine power plant. The bottom header plate is closed off to form a discharge tank to receive the relatively cooled liquid and return it to the power plant cooling system. The tube array is bonded to extended heat transfer surfaces to dissipate the heat to ambient air.

Automobile radiators of the above basic design have been in use from an early period in the development of the automobile. It was soon discovered, however, that radiators failed in service much earlier than anticipated. Failure most frequently occurred at the joints between the tubes and the openings in the header plates. The factors causing failure at the joints are as follows: (1) stresses caused by thermal expansion and contraction of the tubes and header plates; (2) stresses caused by changes in pressure within the tubes; (3) fatigue failure caused by vibrations generated by the engine and road travel; and (4) internal corrosion of the joints by the cooling liquid and additives, as well as external corrosion caused by road salts and chemicals.

A significant effort in radiator design and development has been directed to improving the structural integrity of the tube to header joints. A number of patents have been issued dealing with this problem. U.S. Pat. No. 3,245,465, issued on Apr. 12, 1966, to Fred M. Young, shows a punched header plate to receive an array of oval-shaped liquid conducting tubes. Each punched opening is provided with an extended upset collar portion to increase the strength and contact surface area between the collar and tube. Molten solder is drawn in by capillary action to seal the tube to the collar. As an added feature, a small support plate may be mounted on the tube and bonded to the underside of the header for additional support.

U.S. Pat. No. 4,529,034, issued on July 16, 1985, to Zalman P. Saperstein, shows a punched header plate provided with upset collars to receive the tube ends. The end portion of each tube end and collar are welded to each other on the wet side of the plate to form a complete peripheral weld. For additional support and to plug any cracks or pin holes in the welded joint, the space in the collar to tube joint on the air side of the weld is filled with solder to form a fillet.

U.S. Pat. No. 4,858,686, issued on Aug. 22, 1989, to Gerald C. Calleson, shows a header plate with circular punched openings and circular upset collars. In order to join conventional oval-shaped tubes to circular collars, the tube ends are expanded from oval to circular shape with an external diameter to fit within the collars with a clearance suitable for soldering, brazing or welding. The joint is sealed by soldering, brazing or welding, or any combination of the two. The joint is said to be of increased strength by virtue of the increased contact surface available for bonding.

Although the technology as exemplified by the patents described above has extended the service life of vehicular radiators, a demand has arisen in recent years for a level of quality and length of service not attainable by the prior art. Applicants have made a major improvement in joint design which will advance radiator reliability and length of service far beyond the present state of the art.

This invention also relates to a novel method of manufacturing a radiator incorporating applicants' novel tube to header joint. In the prior art manufacturing process, each individual joint was welded by tracing a path just above and around the periphery of the joint with the arc generating tungsten tip. The welder is programmed to move from joint to joint, repeating the peripheral welding process each time, until a row of joints is completed. The process is again repeated for an adjacent row until all the rows are welded. It is also known to approximate a complete peripheral weld by making a number of linear passes down a row of joints. It can be seen that the prior art processes can be quite time consuming and expensive.

Applicants have devised a method wherein the welder traces a linear path down a medial portion of a row of joints in a single pass. The process is repeated for each row yielding a great savings in time and cost.

SUMMARY OF THE INVENTION

The overall object of the present invention is to improve upon the prior art tube to header joints to add reliability and service life to automobile and truck radiators prior to the present invention, attention was mainly directed to the strength of the metallic bonding agents with little attention being paid to damage of the base metals. This philosophy led to the peripheral weld backed by a solder fillet which became the standard of the industry. However, applicants discovered that the peripheral weld required so much heat as to metallurgically damage a portion of the tube which extended below the peripheral weld. After extended service in the field, failure occurred in this zone. By lowering the welding temperature and limiting the weld to a portion of the perimeter, metallurgical damage to the tubing can be minimized. The portion of the perimeter not covered by the weld is filled with solder.

It is another object of the invention to provide a tube to header joint with a welded portion of sufficient extent so as to supply the requisite strength while leaving the remaining peripheral portions open. The joints can then be dipped from the welded or wet side in a molten solder bath wherein the solder fills the peripheral gaps and flows on the rear side of the header to supply solder fillets. Being able to dip the joints in the solder bath from the wet side without flooding the rear or air side yields manufacturing advantages and performance.

It is a specific object of the invention to bond the radiator tubes to the header plate using a minimum amount of heat to form a weld sufficient in extent to provide the necessary joint strength.

It is yet another object of the invention to increase the speed of manufacture and reduce the cost of welded heat exchangers by providing for a single welding pass over a row of joints instead of the individual peripheral stepped path of the prior art.

DESCRIPTION OF THE PREFERRED EMBODIMENTS

Figures 1, 2:
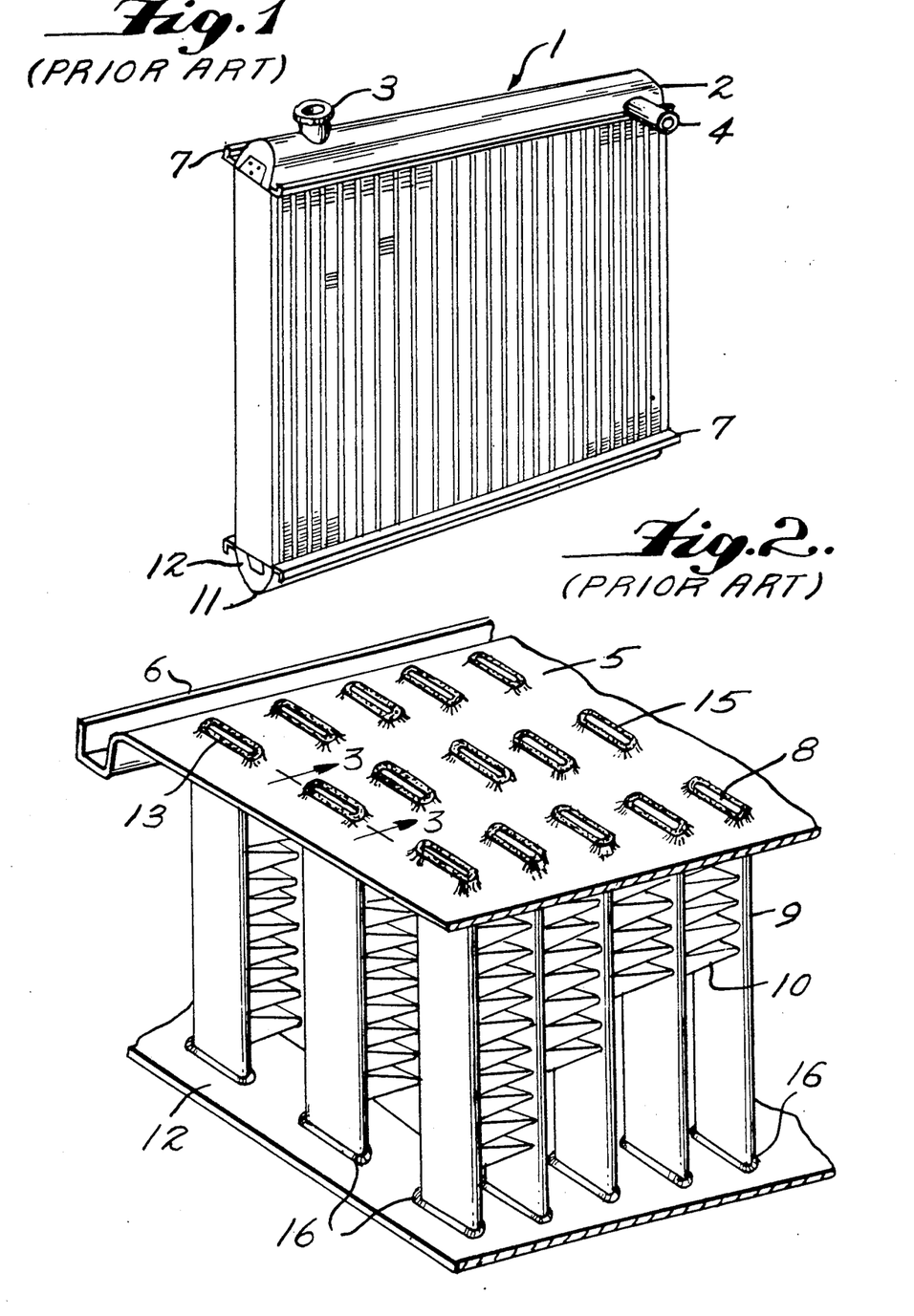
FIG. 1 is a perspective view of a typical prior art automobile radiator.
FIG. 2 is a perspective view of a portion of the radiator core with the top and bottom tank covers removed.
Figure 3:
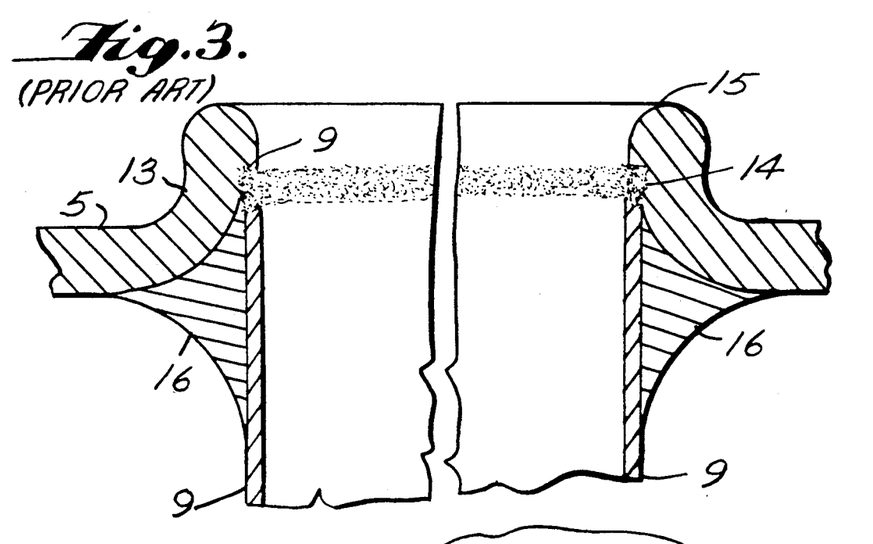
FIG. 3 is an enlarged view of the welded joint taken along lines 3—3 of FIG. 2.

Referring now in general to the drawings, and in particular to FIGS. 1—3, a typical prior art automobile radiator is shown at 1. The radiator comprises a top tank 2 having a filler port 3 and an inlet 4 for receiving hot coolant from a power plant. The bottom of top tank 2 is formed by a top header plate 5, a portion of which is shown in FIG. 2. In a typical example, and not by way of limitation, top tank 2 fits in channels 6 (only one shown in FIG. 2) in header plate 5 and is secured thereto by crimp strips 7. Any suitable means may be employed to render the joint covered by crimp strips 7 liquid tight. Other assembly techniques wherein the components are secured together by bolts, clamps, or by soldering are equally applicable to this invention.

Top header plate 5 is punched out to form a number of oval openings 8 arranged in rows and columns. In the example shown in FIGS. 1 and 2, the header is provided with three rows of openings, each row containing 33 openings (only five are shown in FIG. 2) and 33 columns, each column containing three openings A liquid cooling tube 9 of generally oval shape is inserted in each opening 8 with the long dimension being parallel to the air flow. The tube 9 is sealed in opening 8 to form a liquid tight joint, as will be explained in detail below. A thin sheet of conductive material 10, preferably copper, is bonded to the side walls of adjacent tubes 9 between the columns to provide extended heat transfer surfaces. Zigzag or parallel fin configuration are conventional Hot liquid entering tank 2 flows through the tubes 9 transferring heat through the tube walls into extended heat transfer surfaces 10 to be carried away by ambient air flowing through the radiator. The surface of the header plate exposed to liquid is termed the wet side, while the opposite surface exposed to air is termed the "air side".

The hot liquid flowing down tubes 9 is collected in a bottom discharge tank 11 having an opening, not shown, for returning the cooled liquid to the power plant. Tank 11 has a bottom header plate 12 similar to top header plate 5, except that it faces in an opposite direction. The description of the top header plate 5 and its connection to tubes 9 is equally applicable to bottom header plate 12.

By way of example only, the heat exchanger shown in FIGS. 1 and 2 has three rows of 33 tubes arranged in 33 columns. Each tube is made of thin walled brass in a relatively flat oval configuration about 3/32 inch wide and ⅜ inch long. The flat side is termed the crown. The tubes are spaced about 5/16 of an inch from crown to crown. Again, it is emphasized that the dimensions employed are not critical and are based on the total heat load required to be handled and the type of service.

The above description serves as background for the crux of applicants' invention which involves the metallic bond between the header plates 5, 12 and the tubes 9. Referring to FIGS. 2 and 3, the punched openings 8 in header 5 are provided with upturned collars 13 having oval openings of a size to receive the ends of tubes 9 which have been slightly expanded as at 14. The purpose in expanding the tube ends is to gain a better fit with the punched oval openings and to compensate for the partial blocking of the tube openings which will be created by the weld itself. The ends of tube 9 and collar 13 are welded to form a peripheral closed oval weld 15. The header 5 with welded joints 15 is then introduced to a molten solder bath so that the air side of the header 5 is exposed to molten solder which can form solder fillets 16 in the space between the collar and tube behind weld 15.

With extended service, the solder backed all welded tube to header joint described above was still subject to failure. The most common zone of failure was in the tube below the weld nugget. This zone is marked "failure zone" in FIG. 4. Failure tended to occur in the tube end diameter with the fractures propagating from the ambient side moving inwardly through the tube wall.

Applicants instituted a detailed investigation to determine why failure occurred in the tube below the weld nugget. A number of failure tests were conducted on various configurations of tube to header joints. This involved subjecting the joints to repeated pressure cycles, vibration cycles and tensile breaking tests. The results were charted and graphed. At the same time, photomicrographs were taken of tube specimens on pre-welded and post-welded examples. A metallographic analysis of the specimens conclusively proved that a portion of the tube extending away from the weld was being damaged by excessive heat. This analysis was further confirmed by a microhardness profile. The analysis also showed that the degree and extent of tube damage was directly related to the intensity of the heat and the time of exposure generated by the weld. Finally, analytical stress techniques were used to map the distribution of stresses within the tube to header joint. This analysis confirmed that the area of highest stress occurs in the area of lower strength due to heat damage.

Heating the brass base metal to welding temperature caused an increase in grain size allowing the grain boundaries to be penetrated by intermetallic compounds such as copper and tin. The tin is present in the solder coating initially applied to the brass tubes.

An increase in grain size and penetration of the grain boundaries by these intermetallic compounds are known to promote embrittlement or a loss of ductility. Embrittlement lowers the resistance of a metal to fatigue cracking. It is also known that fatigue cracking is most likely to occur at points of stress concentration. Stress calculations and failure analysis have shown that the stress is concentrated just below the weld nugget. Bending stresses from road vibration and internal pressures of the cooling system are at their highest concentration just below the weld nugget which is the zone of reduced metallurgical properties. In addition, the stress is further focused around the sharp bend provided by the end radius of the oval configuration of the tube. Fatigue cracking at this location of the tube in prior art heat exchangers is believed to be caused by stress concentrations acting on a weld heat damaged tube. Superimposed on the vibrational stresses and acting to accelerate the fatigue cracking process are cyclical expansion and contraction of the tubes caused by thermal and pressure changes. During engine operation, extreme temperature and pressure changes take place which stress the tubes adjacent the welds in the header joints where expansion and contraction are restrained.

Figures 4, 5, 6:
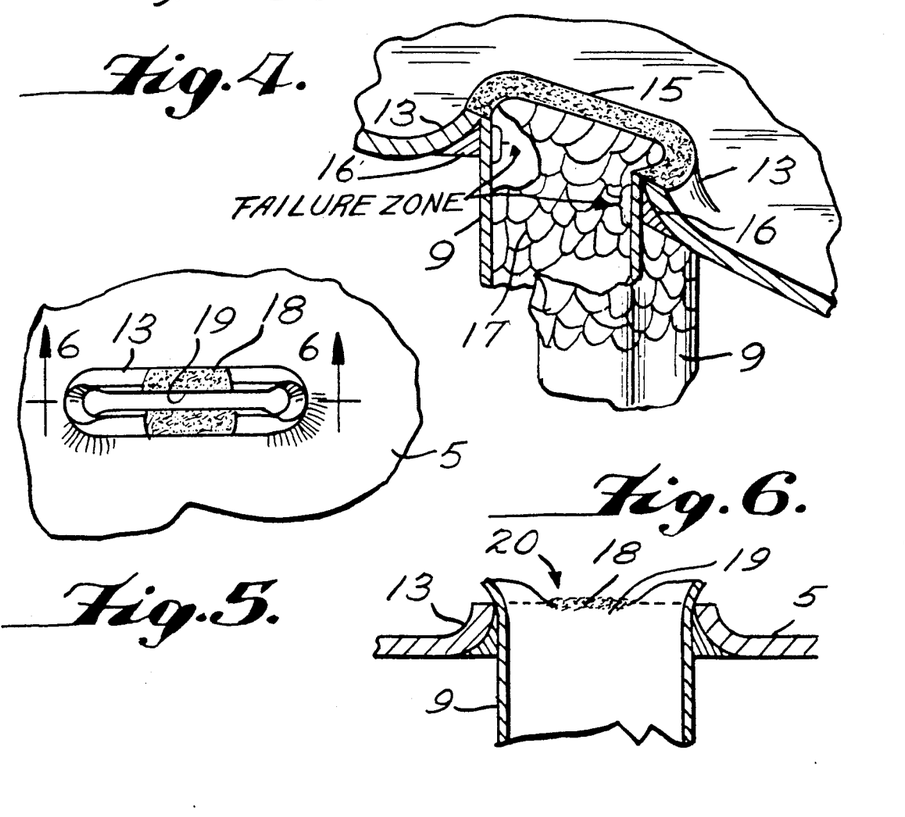
FIG. 4 is a view similar to FIG. 3, but schematically showing the heat affected zone of the tube extending below the peripheral weld.
FIG. 5 is a top plan view of a focused weld joint.
FIG. 6 is a side view of FIG. 5.

FIG. 4 is a part schematic view illustrating the heat failure pattern described above. A peripheral weld 15 joins collar 13 and tube 9. The heat generated by the peripheral weld causes the grain size to be increased and to be penetrated by the aforementioned intermetallic compounds. This effect is shown at 17 where the lacing is meant to simulate a showing on a photomicrograph of increased grain size and intermetallic compound penetration of the grain boundaries. The solder fillets shown at 16 are applied from the outside after the weld is made. The principal point of failure is marked with an arrow pointing to an end radius of the oval tube just below the weld nugget.

Having determined the cause of failure, attention was then directed to welding the tube to header joint with reduced heat damage to the tube. A number of modified weld patterns were applied to the joints involving varying the heat of the weld as well as the locations and extent of the weld. The weld patterns varied from a slight tack weld produced with minimum heat to a visually inspected full weld made with maximum heat. Between these two extremes, a number of focused welds were made with varying weld currents. Each weld was subjected to a stress test which would indicate its overall strength and durability.

Surprisingly, it was discovered that there exists a weld of high strength for each tube to header joint. This high strength weld comprises a high strength focused weld across a medial portion of the tube crown and header. This weld is illustrated in FIGS. 5 and 6 which show an enlarged top and side view, respectively. Referring to FIG. 5, focused weld 18 is seen to bridge a medial portion of the crown 19 of tube 9 and collar 13 of header plate 5. The remaining portion of the peripheral gap is open. Depending upon the size of tube 9 and collar 13, the focused weld yielding maximum strength covers 20 to 80 percent of the periphery of the tube to collar joint, the remaining portion being open.

FIG. 6 is a side view of the focused weld 18 showing a medial depression 20 caused by material of the tube crown and collar being fused to form the weld.

Although it may appear incongruous that a focused weld produces a stronger joint than a full weld, the answer is in the reduction of heat damage to the tube in the areas of highest stress. Historically, a welded peripheral joint replaced a soldered joint because it was more resistant to creep, but the prior art overlooked the fact that sufficient strength against creep could be obtained by a focused weld. The remaining portion of the joint could be sealed with a less creep resistant and more ductile material such as solder. Sealing the remaining portion of the joint by welding degrades the quality of the joint by causing unnecessary heat damage to the tube, particularly when the welding is performed near the tube sections with the highest stress levels.

Another advantage for the focused medial weld is that it keeps the peak welding temperatures away from the end radius bends of the oval tubes. In so doing, heat damage is lessened at the oval bends enabling a better resistance to fatigue failure caused by stress concentrations at these locations. This technique can be readily extended to other heat exchanger geometries with differing patterns of heat concentration.

Figure 7:
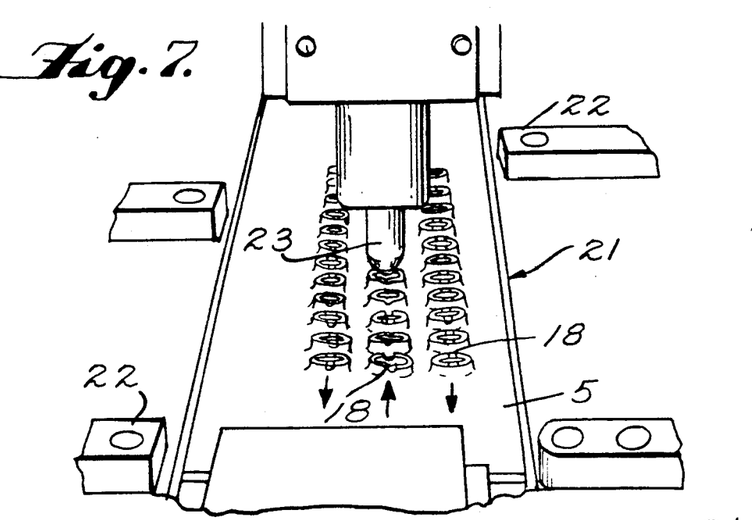
FIG. 7 is a perspective view of an assembled core being provided with focused welds in accordance with the invention.

FIG. 7 shows an assembled core 21 mounted in a welding fixture 22 with the welder 23 moving up and down the rows partially welding each joint.

With a secure creep resistant focused weld in place, the next step was to seal the open portions of the joint to make it liquid tight. It is well known in the art of welded and brazed piping joints to seal cracks and pin holes by applying a high tin content solder and having it draw inwardly of the weld by capillary action. It is also known in the radiator art to back a tube to header welded joint with a plastic or solder backing to seal and reinforce the weld. Following the teachings of the prior art, applicants selected a high tin content solder to seal the partially welded joint.

A wet side dip in a molten solder bath was selected to apply the solder. This arrangement was deemed advantageous since the open space in the weld would easily admit solder to fill the gap and flow behind the welds to form fillets.

Figures 8, 9, 9A, 10:
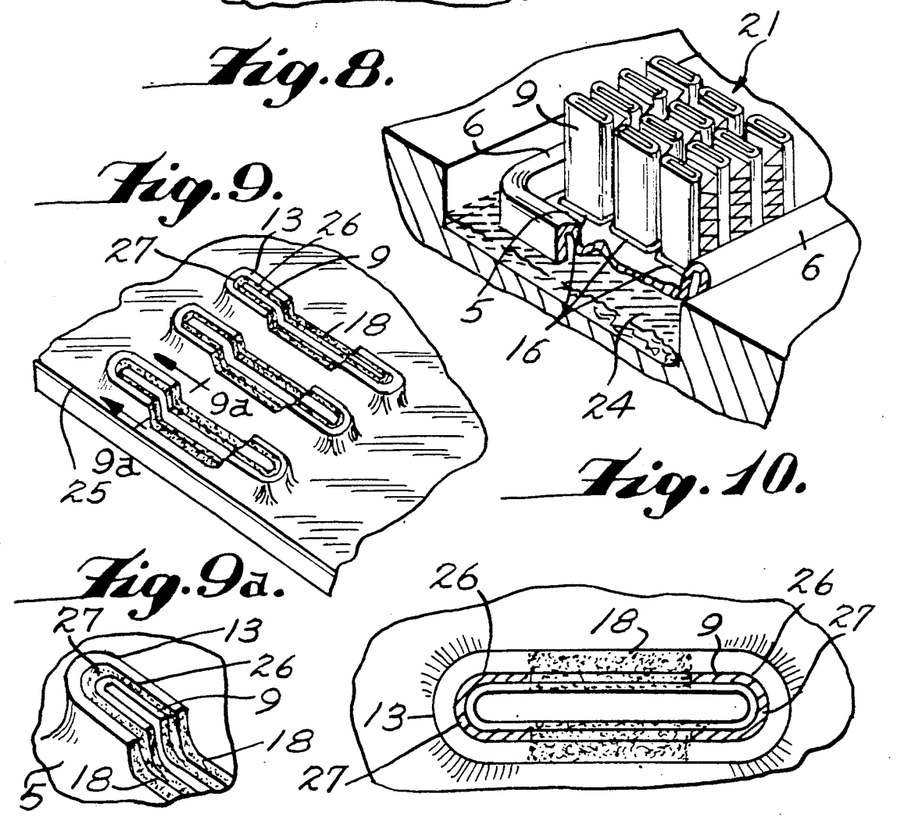
FIG. 8 is a perspective view partly in section showing the header and joints being immersed in a molten solder bath.
FIG. 9 is a view similar to FIG. 2, but showing the radiator core provided with the novel joints of the invention with the several layers illustrated in exaggerated form for clarity.
FIG. 9a is a view taken along lines 9a—9a of FIG. 9.
FIG. 10 is a part schematic view similar to FIG. 5, but showing the perimeter joint formed of a focused weld and the solder filler.

FIG. 8 shows a portion of the assembled core 21 removed from the welding fixture 22 after welding and being dipped in a molten solder bath 24. The wet side of header 5 is immersed in the solder to a depth to enable penetration of the joints and formation of the solder fillets 16. An advantage in a wet side solder dip is in better utilization of solder, less solder is wasted in coating nonessential areas on the air side while the solder is concentrated in the important areas on the wet side and the formation of fillets.

FIG. 9 and FIG. 9a taken along lines 9a—9a of FIG. 9 show on an enlarged scale a portion of the assembled core 21 after being removed from the molten solder bath 24. The solder has penetrated the spaces left open by the focused weld 18 and formed solder fillets 16 on the air side of the header, as shown in FIG. 8. Also, a thin solder layer 25 coats the wet side of header 5 and runs up the collars 13 to the oval perimeter of the joint. Collar 13 and tube 9 are shown separated by an oval gap 26. The end portions of gap 26 left open by weld 18 are filled with solder as at 27.

FIG. 10 is a top plan view, again on an enlarged scale, partly in schematic form, showing a single joint taken from FIG. 9. The oval gap between collar 13 and the tube 9 is shown at 26. The medial portion of oval gap 26 is bridged by focused weld 18. The remaining portion including the outer bends is filled by solder arcs 27. As stated above, primary creep strength is provided by focused welds 18 while the wet side solder arcs 27 and solder fillets 16 on the air side seal the openings in gap 26 and provide ductile structural reinforcement to the joint.

Although a composite welded and soldered joint is the preferred construction, it should be understood that in some instances, a partially brazed bond could be substituted for a focused welded bond. Also, it is contemplated that nonmetallic fillers generically referred to as plastics having the requisite strength and resistance to deterioration may be substituted for solder.

Figure 11:
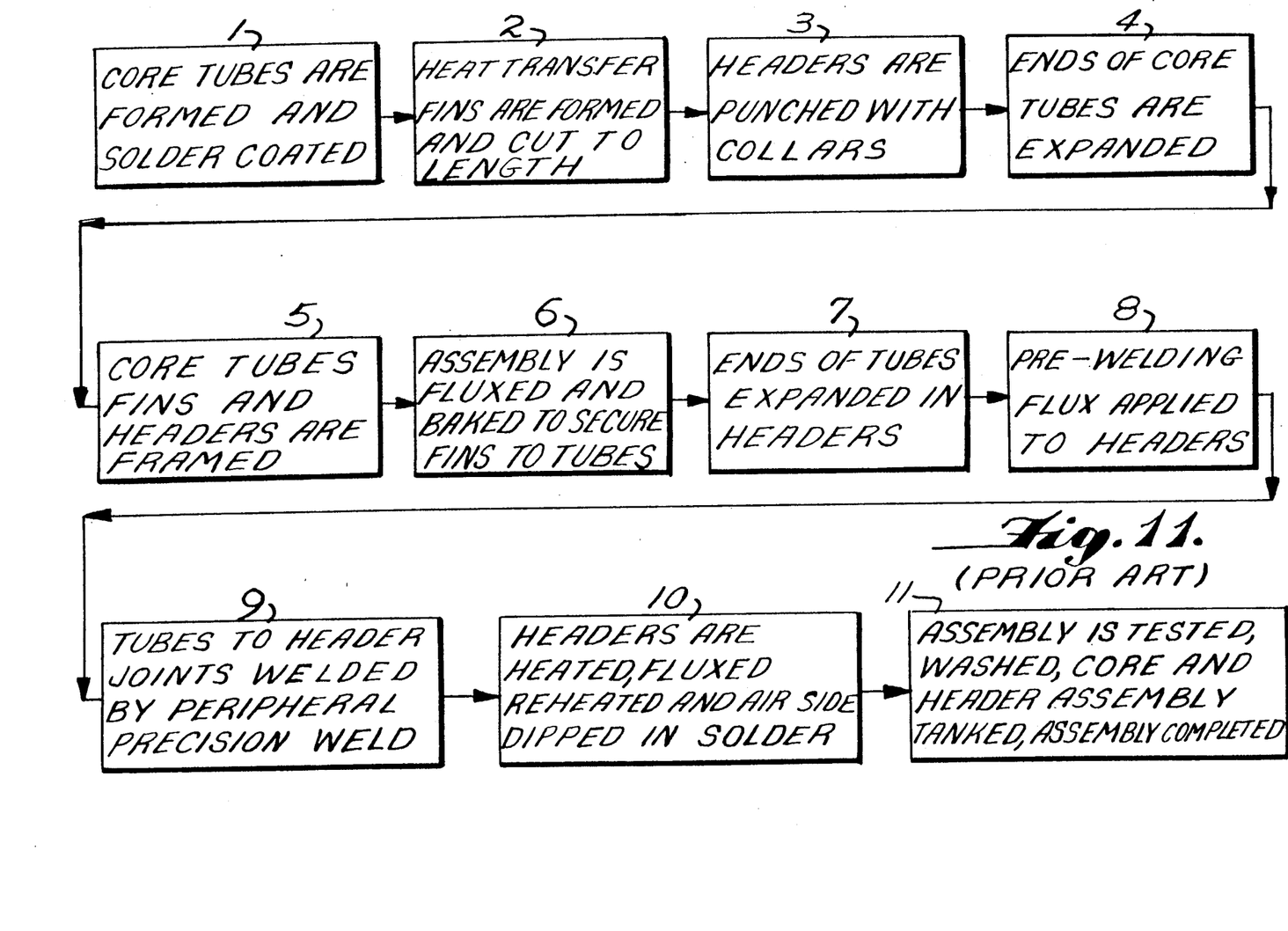
FIG. 11 is a prior art method flow diagram for manufacturing an automobile radiator.

The utilization of the novel tube to header joint of this invention has led to considerable cost saving method steps in the manufacture of radiators. FIG. 11 is a method flow diagram of a typical prior art method of manufacturing an automobile radiator.

As seen in the diagram, core tubes, generally of brass, are first formed and cut to length. The tubes are then coated with solder. The solder coating serves in bonding the heat transfer fins to the tubes. The heat transfer fins are formed and cut to length. The headers, top and bottom, are punched with upstanding collars to receive the tubes. The ends of the tubes are expanded to compensate for any possible partial blockage at the tube mouth caused by the welding overhang. The core tubes, fins, and headers are framed in a support fixture. The assembly is fluxed and baked to secure the fins to the tubes. The ends of the tubes are expanded in the header. This secondary expansion is required to compensate for changes which may have occurred during the baking process. The tube to header joints are made by a welder which traces a precision path around each joint. The welder is programmed to move from joint to joint down a row generating a complete precision peripheral weld at each step. The headers are then heated, fluxed, reheated and solder is applied to the air side of the header to form solder fillets behind the welded joints. The assembly is then tested, washed, and completed by adding tanks and necessary framing.

Figure 12:
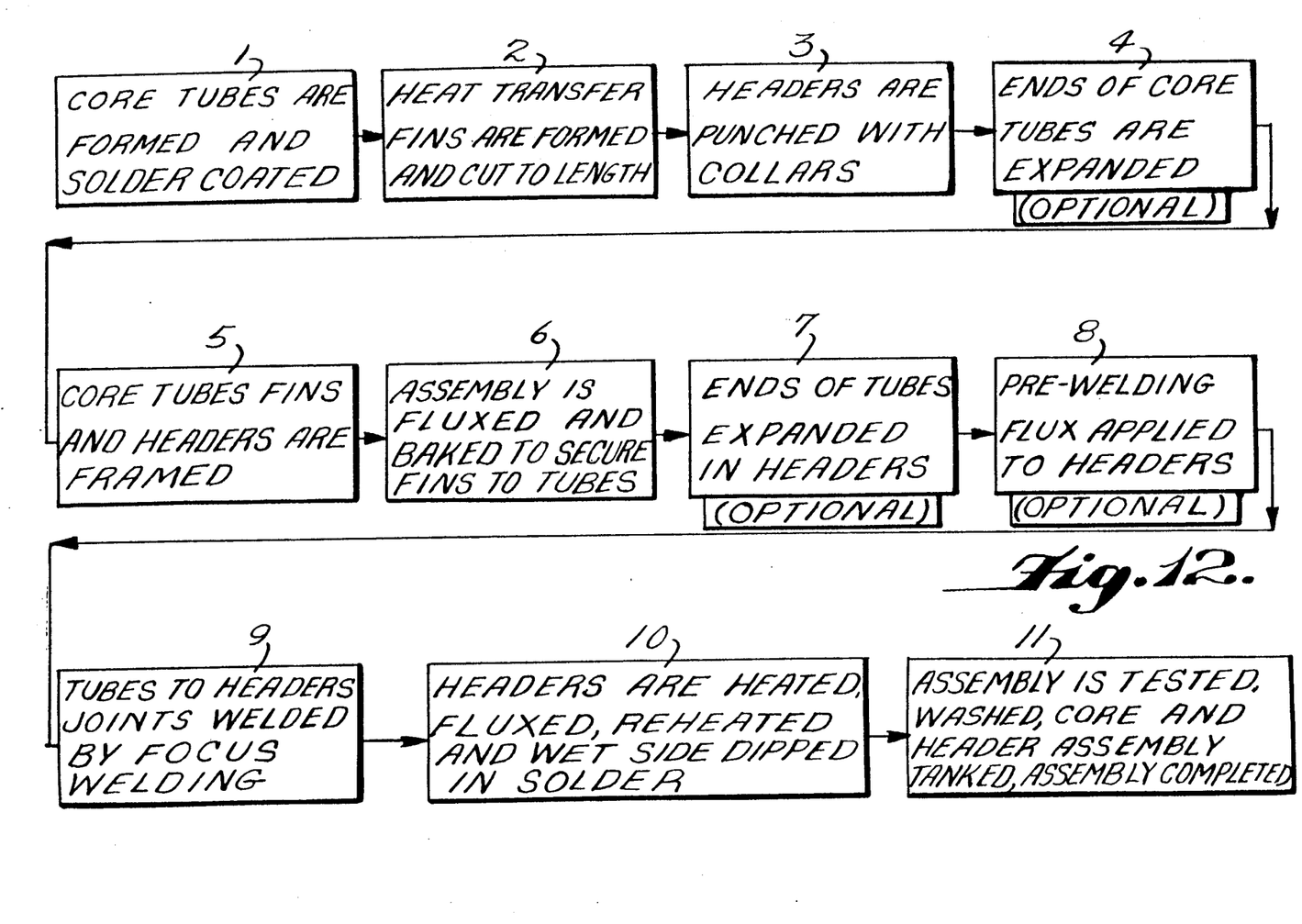
FIG. 12 is a method flow diagram for manufacturing an automobile radiator in accordance with the invention.

FIG. 12 is a method flow diagram incorporating applicants' novel method steps. The most significant difference between the prior art and applicants' novel method resides in step 9. Instead of the peripheral weld of the prior art, applicants employ a single pass down a row of tube to header joints to apply a concentrated weld in a limited medial area. This type of welding operation is termed focus welding since the weld is in a localized specific area. Focus welding of the tube to header joints is shown in FIG. 7.

Header 5, with the assembled core extending below, is clamped in welding fixture 22 to be held in position below welder 23. The welder is programmed to move in a linear path at the desired rate and with the desired voltage to sequentially weld a row of joints. The arrows show the path of travel. The outer row at the right has been provided with focused welds 18 in the forward linear travel of the welder while the middle row is shown being welded by a backward linear movement. The welding operation proceeds in a row by row sequence until all the joints are partially welded.

Focused welding provides joint tensile strength and durability at least equal to prior art peripheral welding. More significantly, focus welding of the tube to header joints has a much lower manufacturing cost. For example, added precision in workpiece location, together with tolerances necessary due to thermal growth which occur during welding in a peripheral weld path are eliminated in our focus weld technique. Also, it is estimated that there is a 33 to 50% savings in cycle time.

Focused welding offers the possibility to further reduce manufacturing costs by the elimination of some current production steps. Currently, secondary expansion as in method step 7 is done prior to welding. It is needed in the prior art method to compensate for tube deflection caused in step 6 and to compensate for further tube deflection caused by a peripheral weld. Since a focus weld may result in less tube deflection during welding, method step 7 may be eliminated. Further, the need for pre-expansion, as in step 4, may also be eliminated. One of the primary functions of an expanded tube end was that the full weld nugget in a peripheral weld would not restrict water flow through the radiator. By minimizing the weld nugget in a focused weld, the water flow restriction is also minimized. Reducing the amount of welding also limits the amount of soot from the weld operation and necessary precleaning stages prior to soldering.

Focused welding also offers the possibility to further reduce manufacturing costs by eliminating step 8. The reduction in temperature which follows the use of a focused weld results in less generation of weld interfering impurities so that step 8 may become optional.

After the welding operation is completed, the header and core assembly are removed from the welding fixture 22. The headers are heated, fluxed, reheated and wet side dipped in solder, as shown in FIG. 8.

Wet side dipping, as in method step 10, is an improvement over air side dipping, as in method step 10 of the prior art. In wet side dipping, the header is immersed only to a depth to ensure solder migration as illustrated at 27 into the air side space around tube 9 behind the weld 18.

Focus welding with wet side dipping in a solder bath leads to a greater flexibility in flux selection and placement to reduce solder waste and cost of operation. Accordingly, a weight reduction resulting from more specific solder application may be achieved.

Although the invention has been described with reference to a specific embodiment and method of making, many variations will be apparent to those skilled in the art, without departing from the scope of the invention as described in the following claims.

What is claimed is:

1. A fluid to air heat exchanger having a pair of spaced tanks, each tank including a header plate having a wet side facing the interior of the tank and an air side facing ambient air, a plurality of openings formed in each header plate, each opening being provided with an upstanding collar projecting from the wet side of the header plate, a plurality of liquid conducting tubes connecting said spaced tanks at said header plate openings forming tube to header joints, each tube to header joint comprising a tube end portion inserted within said collar with a peripheral clearance gap therebetween, means for joining said tube end portion and said collar across said peripheral clearance gap in a liquid tight bond, said bond comprising first and second abutting peripheral portions, said first peripheral portion being formed at a first temperature, said second peripheral portion being formed at a second temperature lower than said first temperature.

2. The combination of claim 1 wherein said first peripheral portion comprises a welded bond.

3. The combination of claim 1 wherein said second peripheral portion comprises a solder bond.

4. The combination of claim 1 wherein said first peripheral portion comprises a welded bond and said second peripheral portion comprises a solder bond.

5. The combination of claim 1 wherein said first peripheral portion comprises a brazed bond.

6. The combination of claim 1 wherein said second peripheral portion comprises a plastic bond.

7. The combination of claim 4 including a solder fillet surrounding said tube on the air side of said header and joining said welded and solder bonds.

8. The combination of claim 4 wherein said first peripheral portion comprises 20 to 80 percent of the extent of said peripheral clearance gap.

9. The combination of claim 4 wherein said tube is of generally oval shape with relatively flat crowns and arcuate end portions, said welded bond being formed on a medial portion of said crowns.

10. The combination of claim 2 wherein said welded bond is formed at a temperature and of a peripheral extent to maximize creep strength while minimizing the heat affected zone of said tube.

11. A vehicular radiator having a pair of spaced tanks, each tank including a header plate having a wet side facing the interior of the tank and an air side facing ambient air, a plurality of oval shaped openings formed in each header plate, each oval shaped opening being provided with an upstanding collar projecting from the wet side of said header plate, a plurality of liquid conducting tubes, each tube being of oval shape with relatively flat crowns and arcuate end portions, said oval shaped tubes connecting said spaced tanks at said header plate openings forming tube to header joints, each tube to header joint comprising a tube end portion inserted within said collar with a peripheral clearance gap therebetween, means for joining said tube end portion and said collar across said peripheral clearance gap in a liquid tight bond, said bond comprising first and second abutting peripheral portions, said first peripheral portion being a welded bond, said second peripheral portion being a soldered bond; and a solder fillet extending from said second peripheral bond to encircle said tube at the air side of said header to seal and strengthen said tube to header joint.

12. The combination of claim 11 wherein said welded bond comprises 20 to 80 percent of the extent of said peripheral clearance gap.

13. The combination of claim 11 wherein said welded bond is formed on a medial portion of said tube crowns.

14. The combination of claim 11 wherein said fillet fills the space between said collar and tube behind said weld.

15. The combination of claim 12 wherein said second peripheral solder bond includes at least two spaced portions.

16. The method of joining a plurality of liquid conducting tubes to a header plate in a storage tank of a heat exchanger wherein said header plate has a wet side facing the storage tank and an air side exposed to ambient air, said method comprising forming a plurality of openings with upstanding collars on the wet side of the header plate, inserting the liquid conducting tubes in the upstanding collars so that each tube end forms a joint having a peripheral gap with an associated collar, welding each tube to collar joint at a portion of the peripheral gap; and filling the remaining portion of the peripheral gap with solder.

17. The method of claim 16, including the steps of arranging said joints in rows and columns; and moving a welder in a path along a row of joints to form a partial weld at a medial location of each peripheral gap.

18. The method of claim 16 including extending the step of filling the remaining portion of the peripheral gap with solder to include the formation of a solder fillet encircling the tube on the air side of the header.

19. The method of claim 17 including the step of forming the tubes in an oval shape with relatively flat crowns and arcuate end portions and wherein the welder moves in a linear path along a medial portion of the flat crowns.

* * * * *